US006625592B1

(12) United States Patent
Dyer et al.

(10) Patent No.: US 6,625,592 B1
(45) Date of Patent: Sep. 23, 2003

(54) SYSTEM AND METHOD FOR HASH SCANNING OF SHARED MEMORY INTERFACES

(75) Inventors: Douglas M. Dyer, Indialantic, FL (US); Eric C. Graves, West Melbourne, FL (US)

(73) Assignee: Harris-Exigent, Inc., Melbourne, FL (US)

(*) Notice: Subject to any disclaimer, the term of this patent is extended or adjusted under 35 U.S.C. 154(b) by 0 days.

(21) Appl. No.: 09/371,219

(22) Filed: Aug. 10, 1999

(51) Int. Cl.[7] .............................. G06F 17/30; G06F 7/00
(52) U.S. Cl. ........................ 707/2; 711/216; 707/100; 370/395.32
(58) Field of Search ................................ 707/100–102, 707/2, 3; 711/216; 370/395.32

(56) References Cited

U.S. PATENT DOCUMENTS

| | | | | |
|---|---|---|---|---|
| 4,650,349 A | * | 3/1987 | Westreich | 400/98 |
| 4,961,139 A | * | 10/1990 | Hong et al. | 707/1 |
| 5,121,495 A | * | 6/1992 | Nemes | 707/3 |
| 5,287,499 A | * | 2/1994 | Nemes | 707/2 |
| 5,319,779 A | * | 6/1994 | Chang et al. | 707/3 |
| 5,390,359 A | * | 2/1995 | Damerau | 707/3 |
| 5,613,110 A | * | 3/1997 | Stuart | 707/1 |
| 5,809,494 A | * | 9/1998 | Nguyen | 707/1 |
| 5,819,291 A | * | 10/1998 | Haimowitz et al. | 707/201 |
| 5,893,120 A | * | 4/1999 | Nemes | 707/206 |
| 5,897,637 A | * | 4/1999 | Guha | 707/101 |
| 5,960,430 A | * | 9/1999 | Haimowitz et al. | 707/6 |
| 6,047,283 A | * | 4/2000 | Braun | 707/3 |
| 6,067,547 A | * | 5/2000 | Douceur | 707/100 |
| 6,115,802 A | * | 9/2000 | Tock et al. | 711/216 |
| 6,212,525 B1 | * | 4/2001 | Guha | 707/101 |

FOREIGN PATENT DOCUMENTS

EP          0350208 A2 * 1/1990 ........... G06F/15/40

OTHER PUBLICATIONS

Morris, R. "Scatter Storage Techniques", Communications of the ACM, vol. 11, No. 1, Jan. 1968, pp. 38–44.*
Microsoft Press® Computer Dictionary, Third Edition, 1997, p. 302. QA76.15.M54 1997.*
Knuth, Donald E. "The Art of Computer Programming, vol. 3/Sorting and Searching, Second Edition", Reading:Addison–Wesley, 1998, pp. 513–549. QA76.6.K64 1997.*

* cited by examiner

Primary Examiner—Jean R. Homere
Assistant Examiner—Luke S. Wassum
(74) Attorney, Agent, or Firm—Akerman Senterfitt

(57) ABSTRACT

A system, method, and data structure are delineated for use in data storage and retrieval. An array of records stored in shared memory contains data entries, and associated hash codes computed from a predetermined hash function. A search request, consisting of one or more data entries, uses the same hash function to generate user codes. The records are searched to find one with hash codes that equal the user codes. This search involves comparisons of native data type entry, which are much faster than character string comparisons. Only after a record is identified with hash codes matching the user codes will a more time-consuming comparison be made between the selected record and the respective data entries of the search request.

14 Claims, 6 Drawing Sheets

SYSTEM AND METHOD FOR HASH SCANNING OF SHARED MEMORY INTERFACES

BACKGROUND OF THE INVENTION

1. Technical Field

This invention relates to data storage and retrieval systems, and, more particularly, to the employment of hashing techniques in shared memory of such systems.

2. Description of the Related Art

In real-time systems, the techniques employed to store and retrieve data must be efficient in the use of time and storage space. As the amount of data increases, efficient data storage and retrieval becomes even more important in order to satisfy the tight time constraints inherent to real-time systems.

Large amounts of related data are commonly retained for later use in well-known data structures, such as linked lists. A linked list data structure typically employs memory pointers to facilitate quick data access. In a typical linked list located in virtual (non-shared) memory, a number of records are linked together by memory pointers, and each record contains one or more data entries.

Data stored in a particular record can be retrieved by searching for a key data entry located in the desired record. Such a search involves a CPU-time-intensive string comparison of each data entry in the linked list, beginning with the first record in the list and working sequentially to the end of linked list, until the key data entry is located. In large storage and retrieval systems, such searching, even if augmented by efficient search procedures, often requires an excessive amount of time due to the large number of CPU-time-intensive string comparisons required.

Another well-known and much faster way of storing and retrieving information from computer storage, albeit at the expense of additional storage, is the so-called "hashing" technique, also called the scatter-storage or key-transformation method. In such a system, the key is operated on by a hashing function to produce a storage address, called a "bucket", in the storage space, called the "hash table", which is a large one-dimensional array of record locations. A specified bucket is then accessed directly for the desired record. Hashing techniques are described in the classic text by D. E. Knuth entitled *The Art of Computer Programming*, Volume 3, Sorting and Searching, Addison-Wesley, Reading, Mass., 1973, pp. 506–549.

Hashing functions are designed to translate the universe of keys into buckets uniformly distributed throughout the hash table. Typical hashing functions include truncation, folding, transposition, and modulo arithmetic. A disadvantage of hashing is that more than one key will inevitably translate to the same bucket, causing "collisions" in storage. Some form of collision resolution must therefore be provided. One well-known collision resolution technique is referred to as "external chaining."

In this scheme, each hash table bucket optimally has a pointer to the head of a linked list of records, all of whose keys translate under the hashing function to that very bucket. Each linked list is itself searched sequentially when retrieving, inserting, or deleting a record. Insertion and deletion are done by adjusting pointers in the linked list. External chaining is discussed in considerable detail in the aforementioned text by D. E. Knuth, in *Data Structures and Program Design*, Second Edition, by R. L. Kruse, Prentice-Hall, Incorporated, Englewood Cliffs, N.J., 1987, Section 6.5, "Hashing," and Section 6.6, "Analysis of Hashing," pp. 198–215, and in Data Structures with Abstract Data Types and Pascal, by D. F. Stubbs and N. W. Webre, Brooks/Cole Publishing Company, Monterey, Calif., 1985, Section 7.4, "Hashed Implementations," pp. 310–336.

The advantage that hash-based searching provides over linked-list-based searching is apparent. Specifically, the latter search requires a CPU-time-intensive sequential search through each data entry of each record, until locating the record containing the desired entry, a process that may require searching every record in the linked list. In contrast, a hash-based search could not require searching every record in a hash table, assuming the search request is based on a key entry that was hashed. This is because a hash table always breaks down its total number of records into smaller groups of records, set up as linked lists. And, a CPU-time-intensive sequential search through one linked list of a number of linked lists, throughout which a given number of records are distributed, will naturally be faster than searching the same number of records distributed in a single linked list.

However, a serious limitation of prior art hash-based approaches is that they partition records according to a hash calculation on only one data entry per record. Records include many data entries, but heretofore only one data entry was the key data entry from which the convenient subgroupings of the hash table were based. Thus, in order to advantageously reduce the number of records that need to be searched to a subset of the total set of available records, previous hash-based searches must use the one key data entry that is hashed. A search based on any other data entry in the records, in effect, reverts to a traditional linked list search, requiring CPU-time-intensive sequential searching through each record until the desired data entry is found.

Another limitation flows from the fact that prior art hash-based approaches partition records according to a hash calculation on only one data entry. Specifically, searches taking advantage of the hashing scheme were fixed in scope. Search scope therefore encompassed any record containing the one key data entry in the search request, which of course, could still result in a large number of possible records, and a longer search. If it is known that a desired record includes a number of specific data entries, it would be highly advantageous to base the search on each of the known entries, in effect, narrowing the scope of the search to a more efficient level. Prior art hashing schemes fail to accommodate this desirable feature, since there is only one key data entry that is hashed upon which to efficiently base the search.

Accordingly, there is a need to provide a system and method of hash scanning which overcome the limitations of the prior art.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
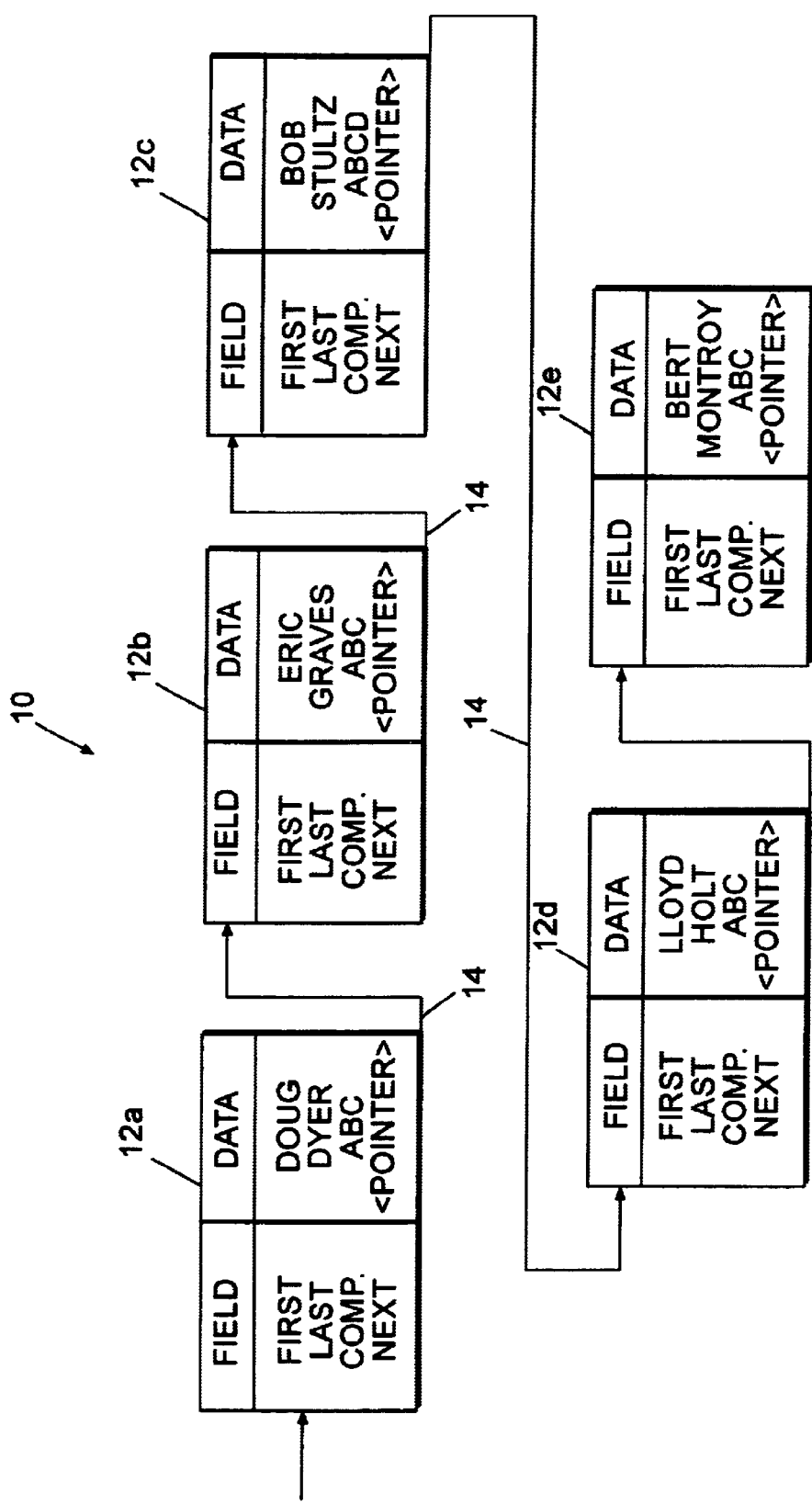
FIG. 1 shows a linked list of records located in non-shared memory.
Figure 2:
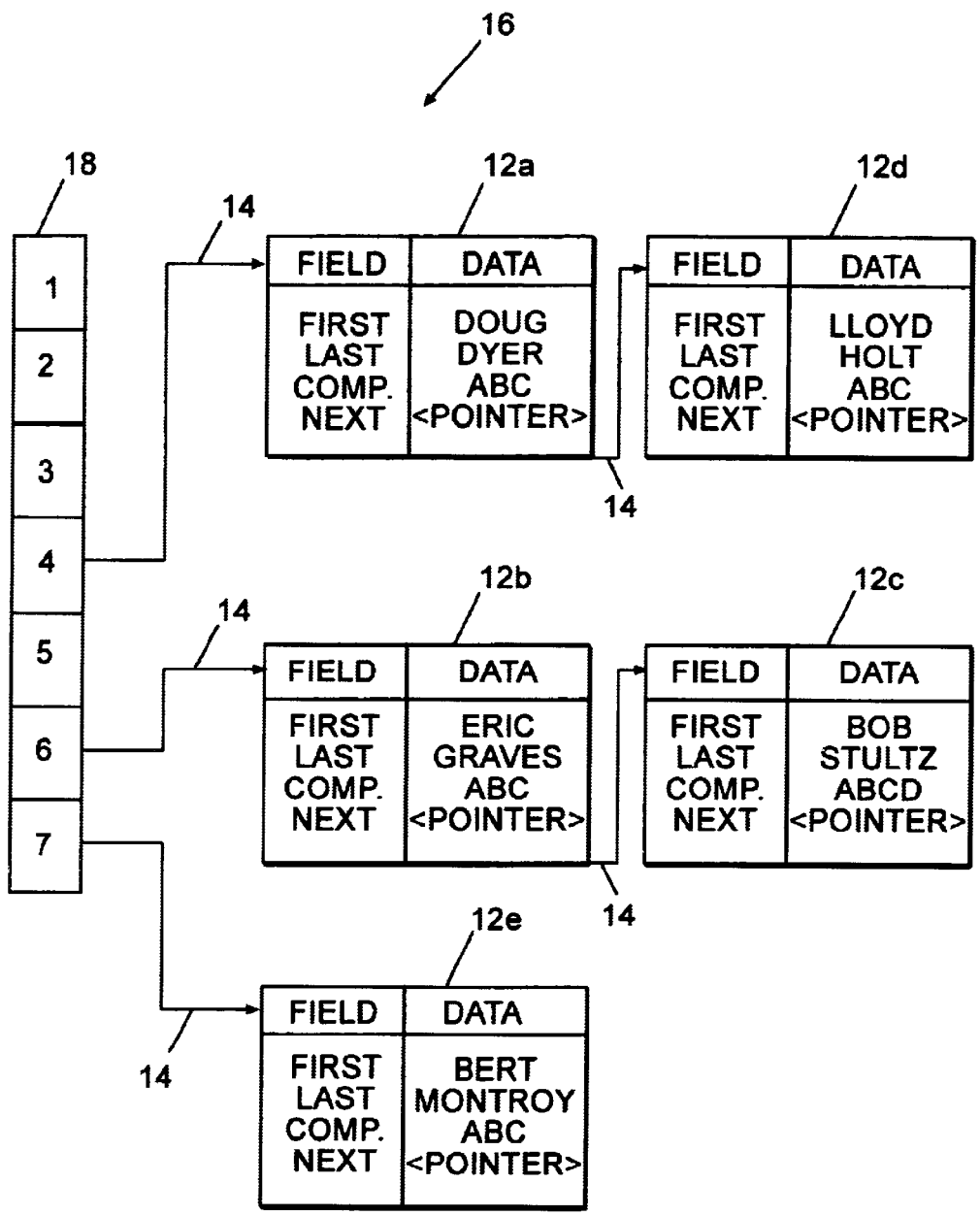
FIG. 2 shows a hash-based linked list of records located in non-shared memory.
Figure 3:
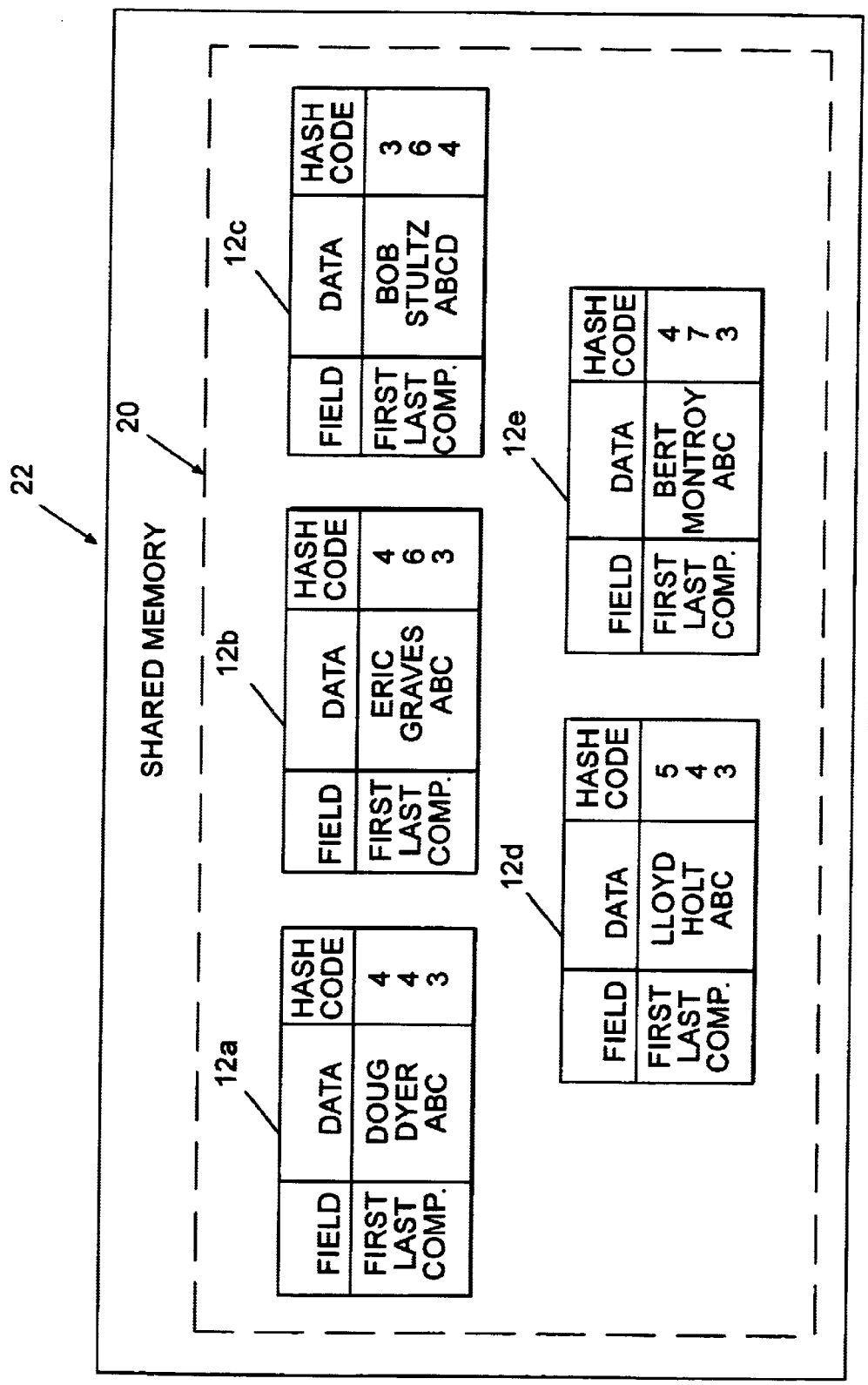
FIG. 3 shows an inventive arrangement for a hash scan table of records located in shared memory.
Figure 4:
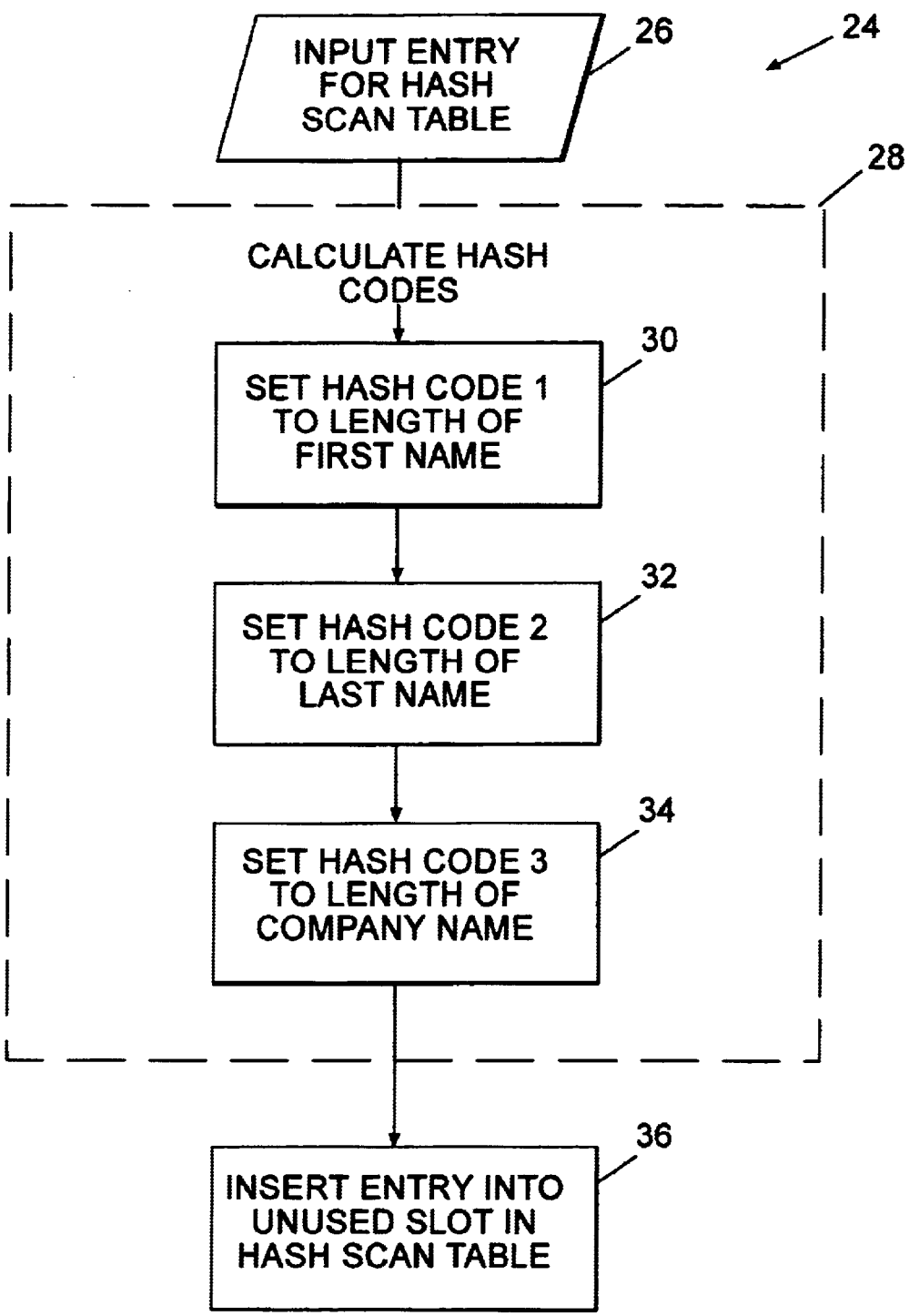
FIG. 4 shows a process for storing records in the hash scan table of FIG. 3.
Figure 5:
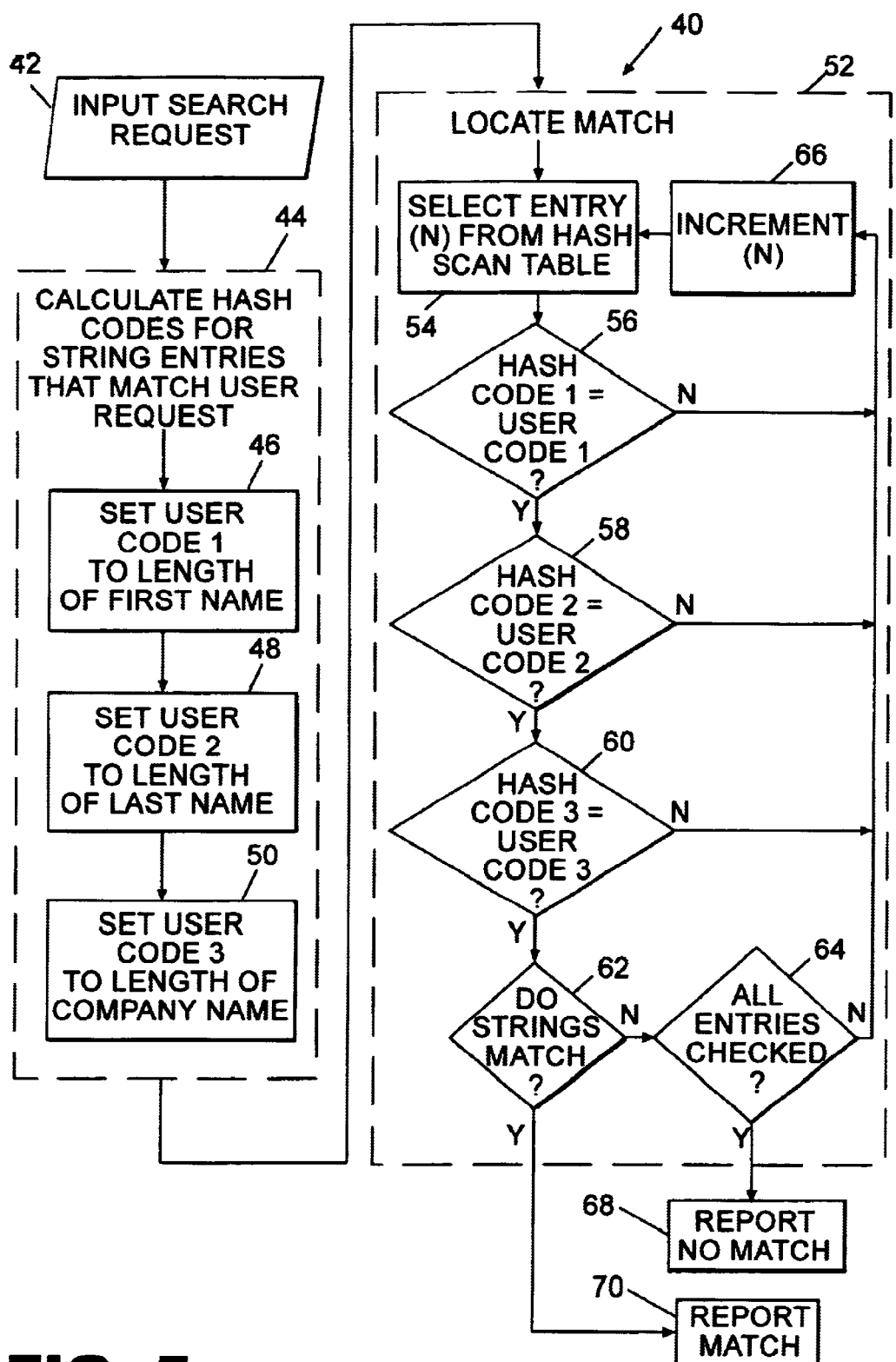
FIG. 5 shows a process for retrieving records from the hash scan table of FIG. 3.

Referring to FIGS. 1–5, a very simple example is employed to facilitate understanding of the inventive arrangements, as represented in FIGS. 3–5. In FIG. 1, a typical prior art linked list 10 is shown located in virtual (non-shared) memory. Linked list 10 includes a number of records 12a–12e linked together by memory pointers 14. Each record 12 contains a plurality of data entries for a given employee. Here, each record 12 contains an employee's first name, last name, and employer, which correspond respectively with data field identifiers First, Last, and Comp. By way of example, record 12a corresponds to Doug Dyer, an employee of company ABC. The last data field entry for each record 12 is followed by a pointer 14 directing attention to the first entry in an adjacent record 12 in linked list 10.

Data stored in a particular record 12 can be retrieved by searching for a particular key value located in the stored records 12a–e. For example, in retrieving Bert Montroy's record 12e, one could employ a search for the key value, Montroy, the desired employee's last name. This search involves a CPU-time-intensive string comparison of each last name data entry, beginning at the top of record 12a and working sequentially to the end of linked list 10, until the key value, Montroy, is located.

FIG. 2 presents a simplified representation of the external chaining hash technique ("ECHT") of the prior art for use in virtual (non-shared) memory, and in which records 12a–e of FIG. 1 are depicted. More specifically, the ECHT 16 depicts a plurality of buckets 18, each identified by a hash code value (1-7) set according to a predefined hashing function, which for purposes of this discussion is the number of letters in the last name for each record 12. Thus, the linked list of records 12a and 12d containing four-letter last names are linked by pointers 14 to hash bucket number four. Similarly, records 12b and 12c are linked by pointers 14 to hash bucket number six, and record 12e is linked via pointer 14 to hash bucket number seven.

A preferred embodiment of the invention is disclosed in the example of FIGS. 3–5. As shown therein, data entries are input into records 12 forming a hash scan table 20 located in shared memory 22 of a conventional computer. FIG. 3 represents the table 20, while FIG. 4 illustrates the data input process 24. As in FIGS. 1–2, records 12 contain data entries for employees' names and employer. Each data entry is operated on by a hash function to produce hash codes, which are also stored in table 20. The exemplary hash function counts the number of characters in a data entry to set the corresponding hash code. In FIG. 5, a process 40 for record retrieval is also illustrated.

Figure 6:
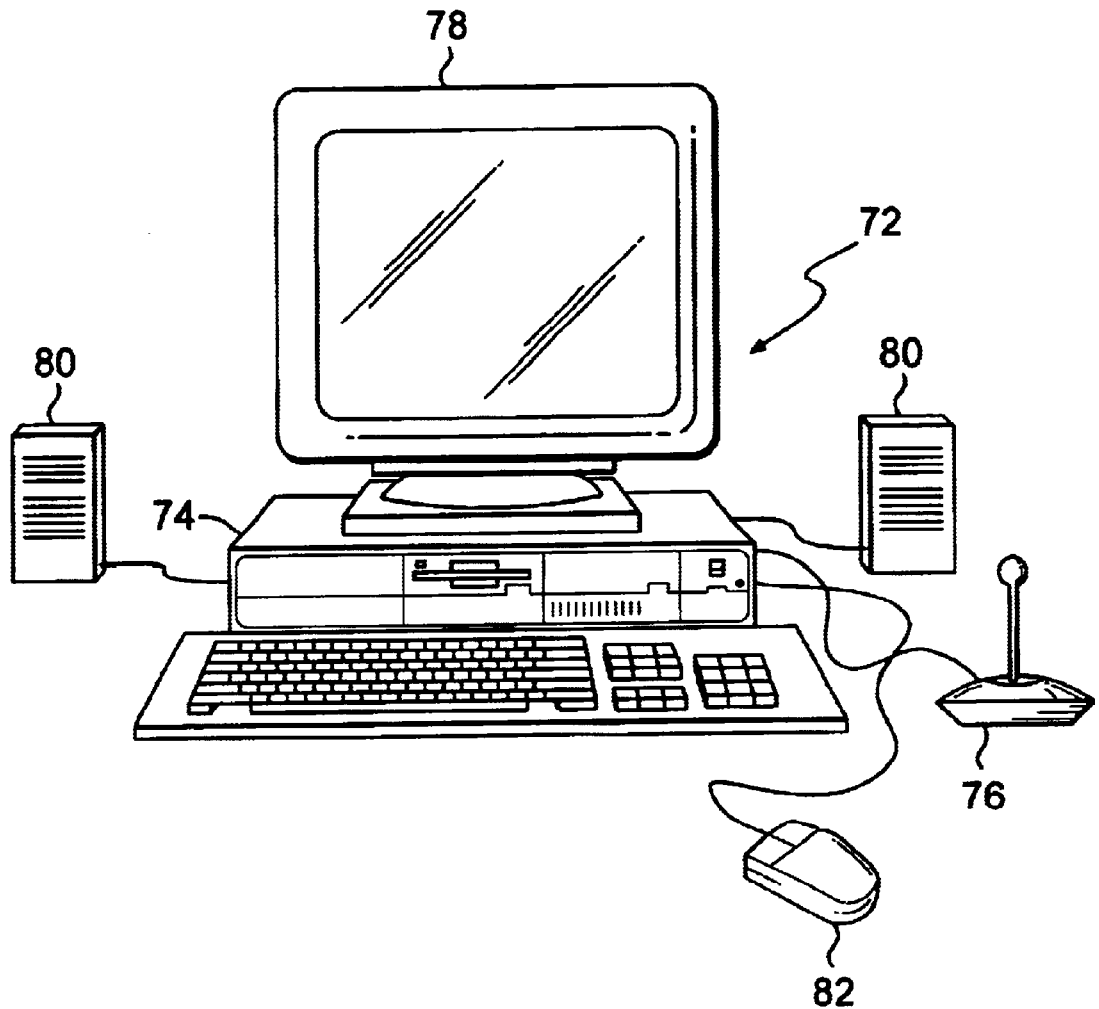
FIG. 6 shows a typical computer system for use in conjunction with the present invention.

FIG. 6 shows a typical computer system 72 for use in conjunction with the present invention. The system is preferably comprised of a computer 74 including a central processing unit (CPU), one or more memory devices and associated circuitry. Computer system 72 also includes at least one user interface display unit 78 such as a video data terminal (VDT) operatively connected thereto. The CPU may comprise any suitable microprocessor or other electronic processing unit, as is well known to those skilled in the art. An example of such a CPU would include any member of the family of Pentium-brand microprocessors available from Intel Corporation or any similar microprocessor. Speakers 80, microphone 76, and an interface device, such as mouse 82, may also be provided with system 72, but are not necessary for operation of the invention as described herein.

The various hardware requirements for computer system 72 as described herein can generally be satisfied by any one of many commercially available high speed multimedia personal computers offered by manufacturers such as International Business Machines Corporation (IBM), Compaq, Hewlett Packard, or Apple Computers.

Moreover, any conventional operating system may be implemented, such as one of the Windows family of operating systems, such as Windows NT, Windows 95 or Windows 98 which are available from Microsoft Corporation of Redmond, Wash. However, the inventive arrangements are not limited in this regard, and may also be used with any other type of computer operating system. The inventive arrangements can be implemented by a programmer, using commercially available development tools for the operating systems described above.

Referring to FIG. 3, an inventive arrangement is shown of hash scan table 20 located in shared memory 22. As used herein, the term "shared memory" refers to any region of physical memory in which two or more processes or applications each have access. Unlike the arrangements shown in FIGS. 1 and 2, there are no pointers 14 in table 20. Such pointers are preferably avoided in the present invention because use of such pointers in shared memory 22 is generally cumbersome. In addition to storing data entries for an employee's first name, last name, and employer; the records 12a–e also store a hash code for each data entry.

By way of example, the hash codes are generated and stored in records 12a–e using a hash function producing an integer hash code equal to the number of characters in each respective data field entry. To illustrate, in record 12a the first name, last name, and company data entries have four, four and three characters, respectively. Thus, the first, last, and company name hash codes are respectively set and stored in record 12a as four, four, and three. Records 12b–e store similarly generated hash codes.

In the preferred embodiment, each hash code comprises a native data type entry, which those skilled in the art understand to mean a compiler or machine supported data type, such as a 32-bit integer on a Pentium-based system. Pentium-based systems similarly support native data types having 8 and 16 bits, though native data types above the 32-bit size are envisioned.

A native data type entry is preferably used for the hash codes because comparison for matches of such data types is much faster than comparison for matches between string entries. This is true because computer hardware, such as a central processing unit, is designed to most efficiently handle a particular native data type size. In contrast, string entry comparisons, which are performed largely in software, are generally more time-consuming. So, comparisons based on the native data type are preferred. The preferred native data type for a hash code is a numerical value, such as an integer, of optimum size for maximum efficiency on the given platform. However, a hash code may also comprise a string of letters or an alphanumeric string.

Referring to FIG. 4, process 24 illustrates an inventive technique for storing data in records 12a–e of hash scan table 20 from FIG. 3. Data entry and storage into record 12a is described below to demonstrate operation of process 24.

At step 26, the data entries (key values) are input using a keyboard, a message from another computer 74 in the network or from a device external to the network, or other conventional means. Here, those entries consist of: first name (Doug), last name (Dyer), and company (ABC).

At step 28, the hash function generates hash codes, recalling that in this example the hash function equates the character count of each data entry with a respective hash code. Thus, in step 30, hash code 1 is set to four for first name, Doug. Likewise in step 32, hash code 2 is set to four corresponding to last name, Dyer. And, in step 34, hash code 3 is set to three for company name, ABC. In step 36, the data entries and respective hash codes are stored in the next unused slot in hash table 20, here record 12a. Similar procedure is followed for data entry in records 12b–e.

In this example of process 24 operation, all data entries are input in a single step 26, and then sequentially processed for hash code generation in step 28. Those skilled in the art understand that the hash code generation of step 28 could be carried out in parallel, if desired. Moreover, data entry in step 26 could be implemented on a one-field-at-a-time basis, as opposed to entering all fields in one step.

Referring to FIG. 5, process 40 illustrates an inventive technique for retrieving a desired record 12 from hash scan table 20 of FIG. 3. Retrieval of record 12c is described below to demonstrate operation of process 40.

In step 42, the user inputs the search request, which may comprise one or more data entries (key values). Alternatively, the search request may be made by an appropriate message from an external device in communication with one or more of the computers 74 in the network, or other conventional means. For purposes of this example, a key value is input for each data field. Thus, the user would input respectively first, last, and company names of: Bob, Stultz, and ABCD.

In step 44, hash codes are calculated for the string entries matching the user's request. In generating user codes for record retrieval, step 44 employs the same hash function that was used to generate hash codes for storing records 12a–e. Thus, each user code is set to equal the number of characters in a respective string entry of the search request. Accordingly, in step 46 user code 1 is set to three, the length of the character string for Bob. Similarly, in step 48, user code 2 is set to six, corresponding to the length of the character string, Stultz. And, in step 50, user code 3 is set to four, the length of the character string for the desired company name, ABCD.

In step 52, the user codes calculated in step 44 are employed to locate the desired record 12c. In step 54, one of the records 12 from hash scan table 20 is selected for consideration. Typically, an index (N) begins with the top record 12a in the array of records 12. Thus, in step 56 a comparison is made to see if the numeric value for hash code 1 equals user code 1. Here, record 12a has a stored hash code 1 value of four, and user code 1 was set to three in step 46. So, record 12a is not the desired record 12.

As a result of the value-inequality in step 56, a transition to step 66 causes index (N) to advance by one. Accordingly, in step 54 the next record in the array 12b is taken up for consideration. At step 56, the numeric value for hash code 1 stored in record 12b (four) is compared with the numeric value for user code 1 (three). As the numeric value comparison showed inequality again, record 12b is also know not to be the desired record, and as before, step 66 advances index (N) by one.

The next record in the array is 12c, which is the desired record. At step 56, numeric value comparison shows that hash code 1 equals user code 1, both three, resulting in transfer to step 58. Numeric value comparison is made in step 58 between hash code 2 and user code 2, both equaling six. Thus, step 60 is taken, and numeric comparison reveals that hash code 3 and user code 3 both equal four.

At this point, one knows that record 12c has data entries with corresponding hash codes that equal the user codes for the search request. This valuable result is achieved without time-consuming CPU-intensive character string comparisons; rather this outcome is based strictly on numeric value checks, and as a result, the process is very fast.

In step 62, a more time-intensive CPU string comparison is made between the data field entries of record 12c, and the corresponding key words forming the search request from step 42. Since the data field entries for record 12c are the same as the key words of the search request, the strings match and step 70 therefore retrieves the desired record 12c.

There may be situations where the user codes affiliated with a search request match the respective hash codes of a record 12, while the respective strings do not match. Such a scenario could arise, for instance, when the user only knows the last name of an individual for whom a record 12 is sought. For example, assume that the last name, Stultz, was the only key value input in step 42. In this context, user code 1 and user code 3 are not used, so steps 46, 50, 56, and 60 are effectively disabled for searching purposes. Any conventional technique to disable steps associated with unused user codes may be implemented, such as automatically setting unused hash codes to a predetermined default value causing the related steps to be disabled.

Returning to the hypothetical search based on the input search request for last name, "Stultz," user code 2 would be set to six in step 48. At step 54, record 12a would be selected. With step 56 disabled, step 58 would determine that record 12a is not the desired record, since hash code 2 for record 12a does not equal six. Steps 66 and 54 would then select record 12b for consideration. In step 58, hash code 2 equals user code 2, and with step 60 disabled, step 62 commences a string comparison of "Stultz" and "Graves." Since the string comparison does not produce a match, step 64 determines whether all entries of hash scan table 20 have been checked. This is accomplished in any conventional manner, such as storing an end of table flag in the last record 12e of table 20. Here, the end of table condition is not detected, so steps 66 and 54 select record 12c for consideration.

And, following the logic discussed above for process 52, it is determined that record 12c is the desired record. Accordingly, step 70 retrieves record 12c per the user's request. If all records 12 are checked without producing the desired record, step 68 generates a report to the user indicating that the desired record 12 is not in table 20.

The detailed description above regarding the hash scan table 20 and related processes 24 and 40 reveals several notable features, some of which are highlighted below for convenient reference.

The present scheme computes and actually stores hash codes in the records 12 of the hash scan table 20. More particularly, a hash code is computed and stored in a record 12 for each data field entry that it makes sense to do so, from an efficiency standpoint. It makes sense to store hash codes for data field entries that would otherwise require CPU-time-intensive string comparisons to verify whether they match a key value from a search request. Rather than routinely initiating a character string comparison for a particular data field entry, a faster native-data-based comparison can be made between the appropriate hash code and user code.

Only after the quick native-data-based check indicates promise in a given record, would a more comprehensive and time-consuming character string comparison be made.

Additionally, more than one hash code is preferably stored in each record 12 of hash scan table 20. This permits the user to have search requests based on one, two, or as many hash codes as a record 12 includes. Thus, search requests can be tailor-made to the desired level of specificity.

Moreover, hash scan table 20 is preferably implemented in shared memory 22, which offers certain efficiencies over implementation in non-shared memory. Shared memory is a region of physical memory in which two or more programs each have access. In modern operating systems, implementation of shared memory is one of the more common ways to share data among programs running on the same platform. More importantly, use of shared memory is the fastest way to share data between processes, since the data does not have to be copied in between a server process and a client process. Moreover, each process with access to shared memory space is able to examine and potentially modify the data contained therein.

While the foregoing specification illustrates and describes the preferred embodiments of this invention, it is to be understood that the invention is not limited to the precise construction herein disclosed. The invention can be embodied in other specific forms without departing from the spirit or essential attributes. For example, while hash scan table 20 is preferably implemented as an array of records 12 in shared memory 22 without interconnecting pointers 14, implementation modifications could be made by those skilled in the art. For instance, within non-shared memory could be located a series of records 12, which contain hash codes and which may or may not include pointers 14.

While the inventive arrangements are explained with reference to FIGS. 3–5, those skilled in the art will appreciate that the scope of the inventive arrangements is not limited to the specific exemplary description provided herein. For example, in a system of computers 74 which are conventionally linked together as a network, each computer 74 can contain a copy of hash scan table 20 located in its respective shared memory 22. In such a system, a change made to hash scan table 20 in any one of the computers 74 is similarly made in the other computers' hash scan tables 20. More precisely, a change in one computer's hash scan table 20 is reported to the other computers 74 in the network, using a conventional network communication scheme, so that the other computers 74 may similarly modify their copies of hash scan table 20.

Moreover, changes to hash scan table 20, such as by addition, modification, or deletion of records 12 in table 20, may be directed by computer receipt of appropriate instruction provided by a user employing any conventional computer input device. Alternatively, any computer 74 in the network, properly connected to an external system or device, may similarly receive instructions from the external system or device concerning hash table modification. For example, a ground station linked to a satellite may provide instruction to a computer 74 in the network, resulting in change to hash scan table 20. And, as discussed above, a change to hash scan table 20 in one of the network of computers 74 is reflected throughout the remaining computers' copies of table 20. Thus, while the inventive arrangements are represented by the illustrations and accompanying description for FIGS. 3–5, the specific details embodied therein are not intended to limit the inventive scope.

Additionally, the type of hashing function used to describe FIGS. 3–5 is merely exemplary, as any type of hashing function may be implemented into the inventive arrangements. Also, it is not necessary that every data entry in a record be given a hash code, though for data entries that would otherwise necessitate time-consuming string comparisons, hash codes are preferably computed and stored. Accordingly, reference should be made to the following claims, rather than to the foregoing specification, as indicating the scope of the invention.

What is claimed is:

1. A method for data storage and retrieval comprising the steps of:

storing an array of records in a shared region of physical memory, each record in said array comprising multiple data entries;

computing a separate and independent hash code for each of at least two data entries in each record, wherein each separate and independent hash code comprises a native data type entry obtained by operation of a single predetermined hash function on a respective data entry; and storing the computed hash codes with their respective data entries in the array of records in said shared region of physical memory so that successive comparisons of said stored hash codes in the array of records can locate corresponding ones of said respective data entries.

2. The method according to claim 1 wherein a hash code is computed for each data entry.

3. The method according to claim 1 further including the steps of:

receiving a search request comprising at least two data entries;

computing a user code for each data entry of the search request, wherein each user code comprises a native data type entry obtained by operation of the hash function on a respective data entry of the search request; and searching the array for a record containing hash codes and corresponding data entries that match the respective user codes and corresponding data entries of the search request.

4. The method according to claim 3 wherein a match between a record's hash codes and respective user codes of the search request is a precondition to searching for a match between the data entries of the record and the respective data entries of the search request.

5. The method according to claim 4 further comprising the step of reporting if and when no record in the array includes hash codes and corresponding data entries matching the respective user codes and corresponding data entries of the search request.

6. The method according to claim 4 further comprising the step of retrieving the record in the array that includes hash codes and corresponding data entries matching the respective user codes and corresponding data entries of the search request.

7. The method according to claim 1 wherein the records of the array are not linked by pointers.

8. The method according to claim 1 wherein the native data type entry comprises a numeric value.

9. A data storage and retrieval system, comprising: a computer having a shared region of physical memory;

a plurality of records stored in said shared region of physical memory;

at least two data entries stored in each of the plurality of records; and a plurality of separate and independent hash codes stored in each of the plurality of records in said shared region of physical memory, wherein each separate and independent hash code comprises a native data type entry computed by operation of a single predetermined hash function on one of said at least two data entries in a respective record, said separate and independent hash codes supporting successive comparisons to locate corresponding ones of said data entries in the plurality of records.

10. The system according to claim 9 wherein the memory comprises shared memory.

11. The system according to claim 9 wherein the plurality of records comprises an array of records without pointers.

12. The system according to claim 9 wherein the native data type entry comprises a numeric value.

13. A data structure for use in a data storage and retrieval system, comprising:

an array of records without pointers, and stored in a shared region of physical memory;

at least two data entries stored in each record in the array of records; and a plurality of separate and independent hash codes stored in each said record in the array of records in said shared region of physical memory, wherein each separate and independent hash code comprises a native data type entry computed by operation of a single predetermined hash function on one of said at least two data entries in a respective record, said separate and independent hash codes supporting successive comparisons to locate corresponding ones of said data entries in the plurality of records.

14. The structure according to claim 13 wherein the native data type entry comprises a numerical value.

* * * * *